United States Patent [19]
Umino et al.

[11] 3,935,417
[45] Jan. 27, 1976

[54] WELDING OF COPPER AND IRON

[75] Inventors: Tomio Umino, Hitachi; Munenobu Suzuki, Mito; Tomohiko Shida, Hitachi, all of Japan

[73] Assignee: Hitachi, Ltd., Japan

[22] Filed: Aug. 15, 1973

[21] Appl. No.: 388,500

[30] Foreign Application Priority Data
Aug. 30, 1972  Japan .............................. 47-86231

[52] U.S. Cl. ................. 219/121 EM; 219/121 LM; 219/121 P; 219/137
[51] Int. Cl.² .......................................... B23K 15/00
[58] Field of Search ....... 219/121 EB, 121 EM, 118, 219/137; 75/125

[56] References Cited
UNITED STATES PATENTS

| | | |
|---|---|---|
| 2,968,723 | 1/1961 | Steigerwald ................. 219/121 EM |
| 3,020,987 | 2/1962 | Schaunte ........................ 219/118 X |
| 3,403,060 | 9/1968 | Ito et al. ............................ 75/125 X |
| 3,458,683 | 7/1969 | Canonico et al. ............... 219/121 EB |
| 3,617,685 | 11/1971 | Brill et al. ........................ 219/118 X |
| 3,678,242 | 7/1972 | Bennett ............................. 219/118 |

OTHER PUBLICATIONS

Vol. 6 *Metals Handbook* pp. 558–559, 1971.

*Primary Examiner*—J. V. Truhe
*Assistant Examiner*—G. R. Peterson
*Attorney, Agent, or Firm*—Craig & Antonelli

[57] ABSTRACT

A method for welding copper or a copper base alloy and iron or an iron base alloy characterized in that an element for enhancing the mutual miscibility of copper and iron and an element for refining the crystal grains of the weld metal is added to weld metal in a total amount of 1 to 25 percent by weight based on the weld metal, thereby preventing the welded portion from crack formation and segregation.

11 Claims, 6 Drawing Figures

WELDING OF COPPER AND IRON

BACKGROUND OF THE INVENTION

This invention relates to a method for welding copper or a copper base alloy and iron or an iron base alloy to obtain a weld metal which is free from cracks and less in segregation at the welded portion.

According to the prior art method for the welding of copper or a copper base alloy and iron or an iron base alloy, there has been such drawback that the welded portion tends to form cracks and is marked in segregation to become low in corrosion resistance. Further, the welding of copper and iron to form a weld metal having a welded portion free from cracks and high in corrosion resistance has come to be required, like in the welding of a copper-made conductive section and a steel-made high strength section as seen in, for example, U.S. Pat. No. 3,564,316 (Composite Commutator Bars). In the prior art attempts, there have been utilized such processes that nickel or a high nickel alloy known as Inconel is welded on an iron type base material and then the padding and a copper type base material are welded together by use of a welding rod of copper type base material, or nickel or the high nickel alloy is welded on a copper base material and then the padding and an iron type base material are welded together. Recently, there have been adopted such processes that a mild steel and copper are welded using butt beveling by electron beam welding, or Inconel 600, aluminum or a copper-nickel alloy known as Monel metal is incorporated into the weld metal, thereby preventing the formation of cracks at the welded portion by the electron beam welding. According to these processes, however, the growth of column-like crystals in the weld metal is so marked that cracks are liable to be formed at the welded portion. Further, the segregation of copper and iron in the weld metal is so great that the welded portion is low in corrosion resistance. These drawbacks become serious problems in the case of welding of, for example, the aforesaid commutator bars.

SUMMARY OF THE INVENTION

An object of the present invention is to provide a novel method for welding copper or a copper base alloy and iron or an iron base alloy to give a weld metal free from cracks at the welded portion.

Another object of the invention is to provide a novel method for welding copper or a copper base alloy and iron or an iron base alloy to give a weld metal, in which not only the formation of cracks at the welded portion is prevented but also the segregation of copper and iron in the weld metal is minimized or made substantially nil to prevent the welded portion from degradation in corrosion resistance.

A further object of the invention is to provide a method for welding copper or a copper base alloy and iron or an iron base alloy to give a weld metal, which is prevented from segregation of copper and iron and from formation of cracks by incorporating thereinto suitable amounts of a metal element capable of pulverizing crystal grains of the weld metal and a metal element capable of enhancing the mutual miscibility of copper and iron in the weld metal.

In order to accomplish any or all of the above-mentioned objects, the present invention provides a method for welding copper or a copper base alloy and iron or an iron base alloy to obtain a weld metal wherein the state of molten metals can be observed directly, the welding being performed without the use of a flux, characterized in that the weld metal is incorporated with suitable amounts of a metal element capable of pulverizing crystal grains of the weld metal and a metal element capable of enhancing the mutual miscibility of copper and iron in the weld metal, thereby obtaining a sound welded portion. In a preferred embodiment of the present invention, the two elements are incorporated in a total amount of 1 to 25 percent by weight.

The above-mentioned objects, and other objects, characteristics and advantages of the present invention will become apparent from the detailed explanation made below with reference to the accompanying drawings.

DETAILED DESCRIPTION OF THE INVENTION

Figure 1:
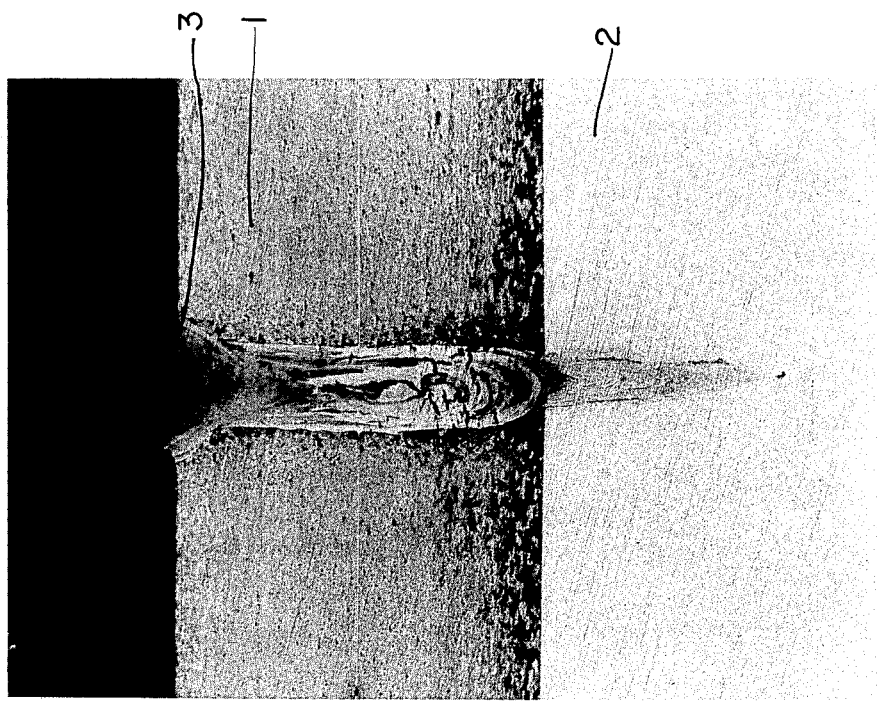
FIG. 1 is a cross-sectional photograph (20 magnifications) of the welded portion of a weld metal obtained by a welding pure copper and mild steel according to the conventional electron beam welding.

The welded portion shown in FIG. 1 is that of a weld metal obtained by lap welding by the known electron beam welding method wherein base metal joints of pure copper 1 and mild steel 2 are stacked. As seen in FIG. 1, considerable cracks and segregation are observed in the weld metal 3.

The present inventors considered that crack formation and segregation at the welded portion of a weld metal obtained by welding copper or a copper base alloy and iron or an iron base alloy were ascribable to such points as mentioned below. (The copper base alloy referred to in the present invention is not an alloy containing a large amount of lead, zinc or the like element which becomes a cause for crack formation, but is an alloy containing less than 10 percent by weight of nickel, silver or the like element which does not become a cause for crack formation, and the iron base alloy referred to in the present invention is an alloy containing more than 50 percent by weight of iron).

The melting point of iron (1,535°C.) is far higher than that of copper (1,083°C.), and when a melt of two metals is cooled, initial crystals of the iron deposit. Moreover, copper and iron scarcely form a solid solution, so that column-like crystals of iron are developed. On the other hand, copper forms a film-like liquid phase at grain boundaries of the column-like crystals, which liquid phase cannot withstand the shrinking stress at the time of coagulation, with the result that cracks are formed. It is therefore considered that if the column-like crystals are inhibited in growth and are pulverized to globules, the shrinking stress is alleviated (and the copper liquid phase at the crystal bounderies would form a solid solution together with a certain element incorporated into the melt of copper and iron) so as to form no cracks.

Figure 2:
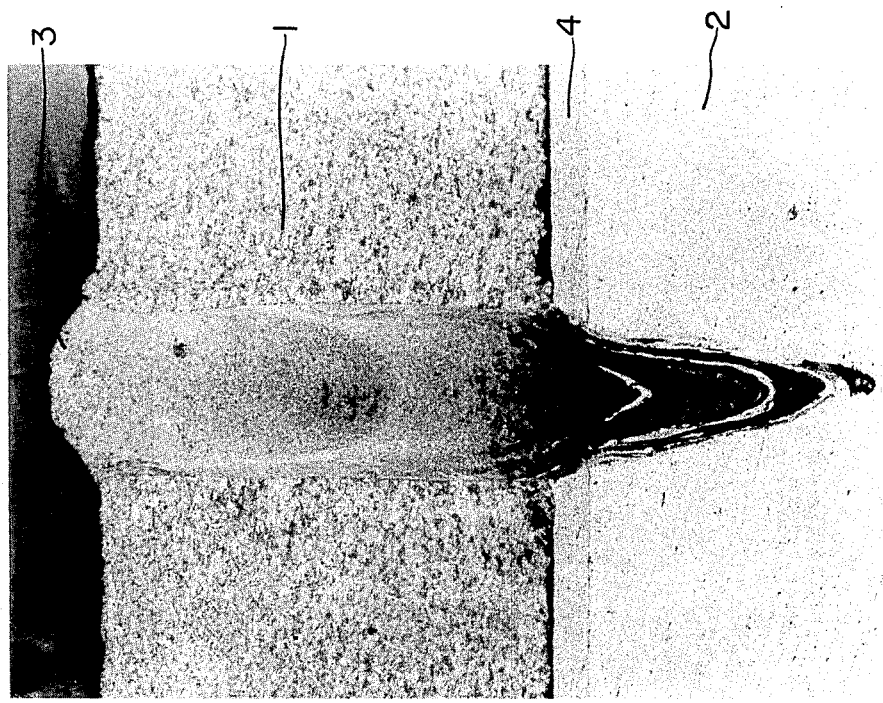
FIG. 2 is a cross-sectional photograph (20 magnifications) of the welded portion of a weld metal incorporated with only titanium.
Figure 3:
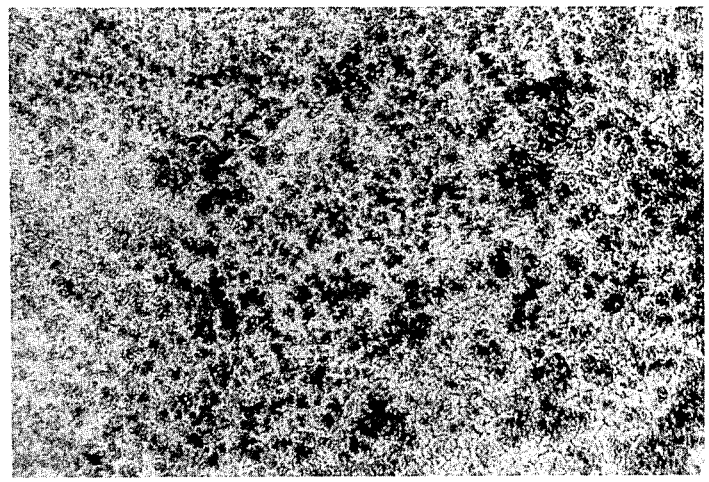
FIG. 3 is a cross-sectional microphotograph (135 magnifications) of the welded portion of a weld metal incorporated with proper amounts of titanium and nickel.

From the above consideration, the inventors thought out the incorporation into the weld metal an element capable of pulverizing into globules the crystal grains of a material composed mainly of iron. The inventors conducted the welding of metal joints while incorporating into the weld metal 8 percent of titanium as an element considered to have such action as mentioned above to obtain the welded portion 4 as shown in FIG. 2. The base metal joints used in the above-mentioned welding were the same as those used in the case of FIG. 1, but were welded while interposing a titanium foil of 0.3 mm. in thickness between the copper joint 1 and the iron joint 2 so that 8 percent of titanium was incorporated into the weld metal. In this case, the crystal grains had surely been pulverized, but considerable segregation was stll observed. In order to prevent this segregation, the inventors incorporated into the weld metal a proper amount of nickel as an element for enhancing the mutual miscibility of copper and iron. As the result, the inventors were successful in obtaining such an excellent weld metal free from cracks and segregation as shown in FIG. 3. The welding materials used in this case were the same as those used in the case of FIG. 1, but a nickel foil of 0.3 mm. in thickness was interposed between the joints in addition to a titanium foil of 0.2 mm. in thickness.

According to many experiments carried out by the present inventors, there have been clarified the amounts of the crystal grain-pulverizing element and the miscibility-enhancing element which are to be incorporated into the weld metal. The amounts of the elements to be incorporated vary depending on the proportions of copper and iron contained in the weld metal. If the amount of iron is smaller than that of copper, sensitivity of crack occurrence of the weld metal becomes small, so that the amounts of the additive elements may be made smaller, while if the amount of iron is relatively larger than that of copper, the amounts of the elements are required to be increased.

The weld metal according to the present invention is not essentially limited in composition, but is preferably composed of 10 to 70 percent by weight of copper and 90 to 30 percent by weight of iron, in view of such object as the prevention of crack formation and segregation. In this case, the total amount of the aforesaid elements to be incorporated into the weld metal is preferably in the range from 1 to 25 percent by weight. In case the proportion of copper in the weld metal is smaller than that of iron, the elements may be incorporated in a larger amount, while in case the proportion of copper is larger than that of iron, the elements may be incorporated in a smaller amount within the range. If the total amount of the additive elements is less than 1 percent by weight, crystal grains of the weld metal cannot sufficiently be pulverized into globules nor prevented from segregation and the welded portion becomes inferior in crack resistance and corrosion resistance. If the total amount of the additive elements is more than 25 percent by weight, segregations become to be recognizable and such metal compounds as Cu-Ti or Fe-Ti are formed to bring about a cause of crack formation.

According to the studies of the present inventors, it has been found that an element, which is higher in melting point than iron can easily form an oxide sufficiently higher in melting point than iron such as Ti, Nb, Al, Ta or Zr, is suitable as the crystal grain-pulverizing element, and that an element, which can easily form a solid solution together with copper and iron and which forms no intermetallic compounds, such as nickel, silver, palladium or platinum, is suitable as the miscibility-enhancing element. It has also been found that when the above-mentioned crystal grain-pulverizing element is used in an amount larger than a certain limit, not only the crystal grains can be pulverized but also copper and iron in the weld metal can be enhanced in mutual miscibility. Even in this case, however, the crystal grain-pulverizing element is not sufficient in miscibility-enhancing action, so that it is most preferable to use the two elements in combination as mentioned above. Titanium among the crystal grain-pulverizing elements, and nickel among the miscibility-enhancing elements, display the most prominent effects.

Figure 4:
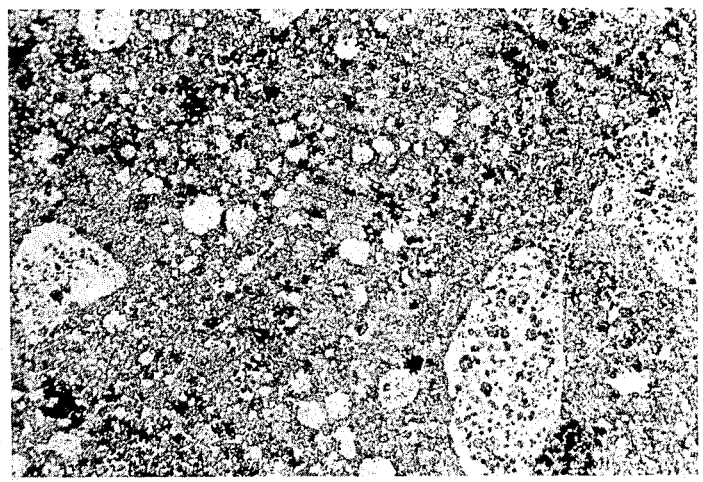
FIG. 4 is a cross-sectional microphotograph (135 magnifications) of the welded portion of a weld metal incorporated with excess amounts of titanium and nickel.

If the amount of the crystal grain-pulverizing element is excessively larger than that of the miscibility-enhancing element, copper and iron in the weld metal are segregated or cracks are formed due to formation of the aforesaid compounds, as shown in FIG. 4. The welding method employed to obtain such welded portion as shown in FIG. 4 was the same as in the case of FIG. 3, except that the nickel and titanium were controlled in thickness to 0.3 mm. and 0.05 mm., respectively, so that 18 percent of titanium and 3 percent of nickel could be incorporated into the weld metal. If the amount of the miscibility-enhancing element is excessively larger than that of the crystal grain-pulverizing element, no segregation is caused, but the crystal grains cannot be pulverized to bring about the danger of crack formation. According to the experiments carried out by the present inventors, it has been found that the amount of the miscibility-enhancing element is preferably 0.5 to 3 times the weight of the crystal grain-pulverizing element, i.e. the amount of the former is preferably 0.2 to 17 percent by weight and that of the latter is preferably 0.8 to 8 percent by weight.

The present invention is suitable for application to electron beam welding, plasma welding, TIG welding, MIG welding and laser welding. These welding methods are performed without using flux and the condition of molten metals can be observed directly. Therefore, electro-slag welding and the like method are not included in this concept. Among the above-mentioned welding methods, the electron beam welding and laser welding are high in heat energy concentrating ability and give only a small thermal affected zone to the base material, so that the present invention is most suitable for application to these methods. The present invention is applicable also to plasma welding, TIG welding and MIG welding, so far as these methods are enhanced in utilization of heat energy by devicing the shapes of joints and the likes.

The present invention is illustrated in detail below with reference to Examples, in which all percentages of metal compositions are by weight.

I. Materials used:
 1. Copper joint material: Oxygen free copper (99.9 % Cu)

2. Iron joint material:
   a. Experiment No. 1: 0.3% C, 0.25% Si, 0.75% Mn, ≤0.03% P, ≤0.035% S, bal. Fe
   b. Experiment No. 2: 0.15% C, 0.5% Si, 1% Mn, 12.3% Cr, ≤0.04% P, ≤0.03% S, bal. Fe
   c. Experiment Nos. 3, 4 and 5: 0.14% C, 0.08% Si, 0.78% Mn, ≤0.026% P, ≤0.016% S, bal. Fe
   d. Experiment Nos. 6, 8 and 11 – 18: 0.24% C, 0.23% Si, 0.8% Mn, ≤0.035% P, ≤0.04% S, bal. Fe
   e. Experiment No. 7: 0.06% C, 0.74% Si, 1% Mn, 8.52% Ni, 18.4% Cr, ≤0.024% P, ≤0.0205% S, bal. Fe
   f. Experiment No. 9: 0.02% C, 52.38% Fe, 29.56% Ni, 18.02% Co, ≤0.02% P, ≤0.03% S
   g. Experiment No. 10: 0.01% C, 0.16% Si, 0.09% Mn, ≤0.009% P, ≤0.007% S, bal. Fe II. Manner of incorporation of the elements:
   a. In welding of lap joint and I-shaped joint, the additive elements in the form of foils were inserted between the two joint materials.
   b. In welding of edge joint according to TIG welding, the additive elements in the form of foils were inserted between the two joint materials.
   c. In welding of specific butt joint according to TIG welding, lip-shaped extrusions were formed on the butt, the additive elements in the form of foils were inserted between the extrusions, and an arc was applied to the edges of the extrusions.
   d. In welding of edge joint according to plasma welding, the additive elements in the form of foils were inserted between the ends of the two joint materials, and a plasma was applied along the edges of the two joint materials.
   e. In welding of butt joint according to plasma welding, the elements in the form of foils were inserted between the two joint materials.
   f. In welding of butt joint according to MIG welding, the additive elements were formed into a Cu-Ni-Ti alloy, which was then used as a filler wire.
   g. In welding of lap joint according to laser welding, the additive elements in the form of foils were inserted between the upper and lower joint materials.

III. Welding conditions:
   a. Experiment Nos. 1 and 3: Electron acceleration voltage 150 K, beam current 17 mA, upper focus, welding speed 1.0 m/min, deflection frequency 1000 Hz, Amplitude 1.5 mm.
   b. Experiment No. 2: Beam current 23 mA, other conditions were the same as in Experiment Nos. 1 and 3.
   c. Experiment No. 4: Welding current 50 A, welding speed 0.3 m/min.
   d. Experiment No. 5: Flow amount of center plasma gas 1.0 liter/min, current 80 A, welding speed 0.4 m/min.
   e. Experiment No. 6: Welding current 150 A, welding speed 0.2 m/min.
   f. Experiment Nos. 7 and 8: Beam current 15 mA, other conditions were the same as in Experiment Nos. 1 and 3.
   g. Experiment No. 9: Beam current 13 mA, other conditions were the same as in Experiment Nos. 1 and 3.
   h. Experiment No. 10: Welding speed 0.2 m/min, other conditions were the same as in Experiment No. 4.
   i. Experiment No. 11: Flow amount of center plasma gas 3.0 liter/min, current 150 A, welding speed 0.3 m/min.
   j. Experiment No. 12: Flow amount of center plasma gas 1.5 liter/min, other conditions were the same as in Experiment No. 11.
   k. Experiment No. 13: Beam current 25 mA, welding speed 0.5 m/min, other conditions were the same as in Experiment Nos. 1 and 3.
   l. Experiment No. 14: Welding speed 0.5 m/min, other conditions were the same as in Experiment Nos. 1 and 3.
   m. Experiment No. 15: Welding speed 0.5 m/min, other conditions were the same as in Experiment No. 7.
   n. Experiment Nos. 16 and 18: Beam current 20 mA, welding speed 0.5 m/min, other conditions were the same as in Experiment Nos. 1 and 3.
   o. Experiment No. 17: Laser power 10 KW, welding speed 0.5 m/min.

IV. Weld metal composition (the composition of weld metal varies depending on the portion of the weld metal; each composition shown below is an average value at the central portion of the weld metal as measured according to X-ray microanalysis):
   a. Experiment No. 1: 67% Fe, 22.7% Cu, 3%Ti, 6% Ni, others C, Si, Mn, P and S
   b. Experiment No. 2: 62% Fe, 21% Cu, 0.9% Ti, 2.1% Ni, about 6% Cr, others C, Si, Mn, P and S
   c. Experiment No. 3: 43.0% Fe, 36% Cu, 5% Ti, 15% Ni, others C, Si, Mn, P and S.
   d. Experiment No. 4: 50% Fe, 47.5% Cu, 0.5% Ti, 1.0% Ni, others C, Si, Mn, P and S
   e. Experiment No. 5: 53% Fe, 44% Cu, 0.5% Ti, 1.5% Ni, others C, Si, Mn, P and S
   f. Experiment No. 6: 53% Fe, 40.7% Cu, 1.5% Ti, 3.5% Ni, others C, Si, Mn, P and S
   g. Experiment No. 7: 50.5% Fe, 23% Cu, 5.0% Ti, 12.0% Ni, 9.0Cr, others C, Si, Mn, P and S
   h. Experiment No. 8: 68% Fe, 22.7% Cu, 3.0% Ti, 5.0% Ni, others C, Si, Mn, P and S
   i. Experiment No. 9: 38.0% Fe, 24.3% Cu, 2.5% Ti, 22.5% Ni, 12.0% Co, others C, Si, Mn, P and S
   j. Experiment No. 10: 45% Fe, 50.2% Cu, 2.0% Ti, 2.5% Ni, others C, Si, Mn, P and S
   k. Experiment No. 11: 45% Fe, 40% Cu, 6% Ti, 9% Ag
   l. Experiment No. 12: 41.5% Fe, 38.5% Cu, 13% Ni, 6.5% Nb, others C, Si, Mn, P and S
   m. Experiment No. 13: 64.0% Fe, 18.5% Cu, 8.5% Ni, 8.0% Ta, others C, Si, Mn, P and S
   n. Experiment No. 14: 41.0% Fe, 40.0% Cu, 12.0% Ni, 6.0% Zr, others C, Si, Mn, P and S
   o. Experiment No. 15: 45% Fe, 44% Cu, 5.5% Ti, 4.5% Al
   p. Experiment No. 16: 61.5% Fe, 30.0% Cu, 3.7% Ti, 4.0% Nb, others C, Si, Mn, P and S
   q. Experiment No. 17: 65% Fe, 27% Cu, 3.0% Ti, 3.5% Ta
   r. Experiment No. 18: 67% Fe, 22.5% Cu, 5.0% Ti, 4.5% Zr, others C, Si, Mn, P and S The above-mentioned welding methods and results of the experiments were as summarized in the following table:

| Experiment No. | Welding method | Type of joint | Additive elements | Bead width (mm) | Penetration depth (mm) | State of weld metal |
|---|---|---|---|---|---|---|
| 1 | Electron beam welding | Lap joint | Ti + Ni | 2.0 | 3.8 | No cracks nor segregation observed |
| 2 | Electron beam welding | Lap joint | Ti + Ni | 2.5 | 3.7 | No cracks nor segregation observed |
| 3 | Electron beam welding | Butt joint | Ti + Ni | 2.0 | 4.0 | No cracks nor segregation observed |
| 4 | TIG welding | Edge joint | Ti + Ni | 2.0 | 1.5 | No cracks nor segregation observed |
| 5 | Plasma welding | Edge joint | Ti + Ni | 2.0 | 1.0 | No cracks nor segregation observed |
| 6 | MIG welding | Butt joint | Ti + Ni | 6.0 | 4.0 | No cracks nor segregation butt |
| 7 | Electron beam welding | Lap joint | Ti + Ni | 2.0 | 5.0 | No cracks nor segregation observed |
| 8 | Electron beam welding | Lap joint | Ti + Ni | 2.0 | 3.0 | No cracks nor segregation observed |
| 9 | Electron beam welding | Lap joint | Ti + Ni | 1.8 | 3.5 | No cracks nor segregation observed |
| 10 | TIG welding | Specific but joint | Ti + Ni | 4.0 | 1.5 | No cracks nor segregation observed |
| 11 | Plasma welding | Butt joint | Ti + Ag | 3.0 | 5.0 | No cracks nor segregation observed |
| 12 | Plasma welding | Butt joint | Nb + Ni | 3.0 | 5.0 | No cracks nor segregation observed |
| 13 | Electron beam welding | Lap joint | Ta + Ni | 3.5 | 8.0 | No cracks nor segregation observed |
| 14 | Electron beam welding | Butt joint | Zr + Ni | 3.0 | 5.0 | No cracks nor segregation observed |
| 15 | Electron beam welding | Butt joint | Ti + Al | 2.5 | 5.0 | Cracks and segregation observed |
| 16 | Electron beam welding | Lap joint | Ti + Nb | 2.5 | 7.5 | Cracks and segregation observed |
| 17 | Laser welding | Lap joint | Ti + Ta | 3.0 | 5.0 | Cracks and segregation observed |
| 18 | Electron beam welding | Lap joint | Ti + Zr | 2.5 | 7.5 | Cracks and segregation observed |

In the case Experiment No. 10, the copper and iron joint materials of 4 mm. in thickness were used and lip-shaped edge type bevelings of 1 mm. in thickness were formed at the end of each joint material, and each element in the form of a foil of 0.1 mm. in thickness was inserted between the lip bevelings.

Figure 5:
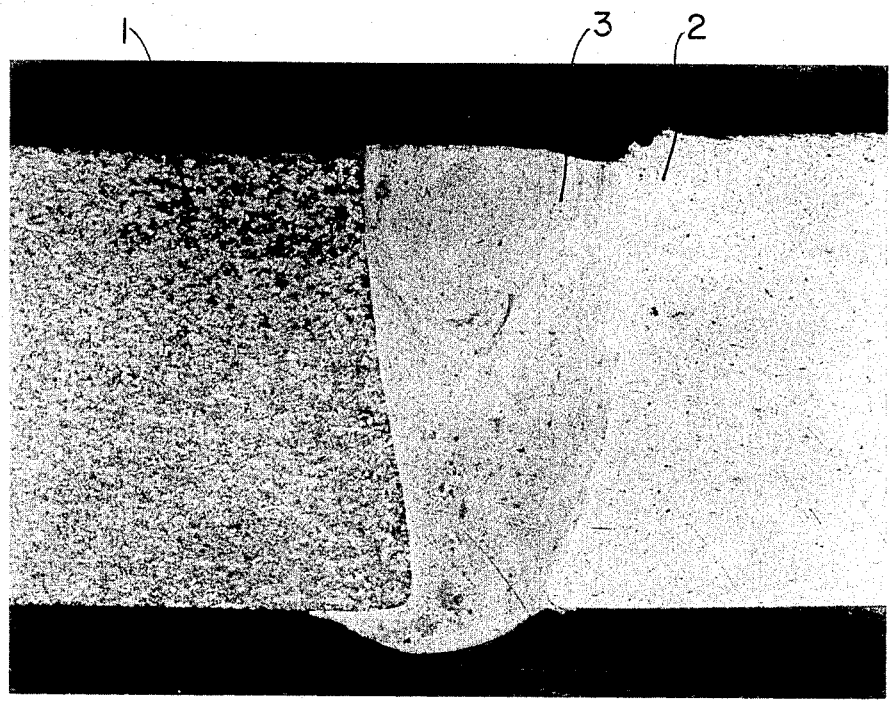
FIG. 5 is a cross-sectional photograph (20 magnifications) of the welded portion of a weld metal incorporated with proper amounts of titanium and nickel which was obtained by using electron beam welding to I-shaped butt joint.
Figure 6:
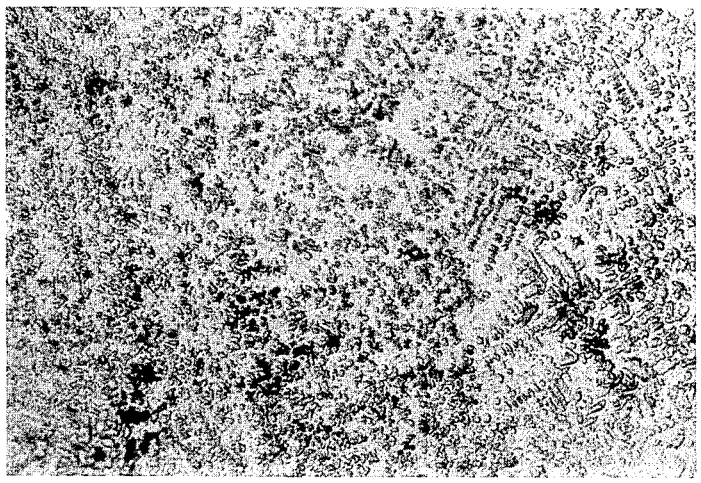
FIG. 6 is a microphotograph (135 magnifications) of the weld metal shown in FIG. 5.

FIG. 5 shows a cross-sectional photograph of the weld metal obtained in Experiment No. 1, and FIG. 6 shows a microphotograph of the weld metal obtained in Experiment No. 7. From these photographs and table, it is understood that according to the present invention, an extremely sound weld metal free from cracks and segregation can be obtained.

While the present invention has been illustrated in detail above with reference to a limited number of examples, it is needless to say that the scope of the invention is not limited to these examples.

What we claim is:

1. A method for welding copper or a copper base alloy and iron or an iron base alloy wherein the welding is performed without the use of a flux and a molten metal can be observed directly, characterized in that a copper joint material containing at least 90 percent of copper and an iron joint material containing at least 50 percent of iron are welded together by melting closely adjacent portions of the copper joint material and the iron joint material into a weld metal and by incorporating into said weld metal a first element for pulverizing the crystal grains of the weld metal, said first element being at least one member selected from the group consisting of titanium, aluminum, zirconium, niobium, and tantalum, and a second element for enhancing the mutual miscibility of copper and iron in the weld metal, said second element being at least one member selected from the group consisting of nickel, silver, paladium and platinum, wherein said first element is added in an amount of from 0.8 to 8 percent by weight and said second element is added in an amount of from 0.2 to 17 percent by weight, based on the weight of the weld metal.

2. A method according to claim 1, wherein the first element is titanium and the second element is nickel.

3. A method according to claim 1, wherein said welding is performed by electron beam welding and the copper joint material and the iron joint material are arranged in direct contact with members of the first element and of said second element being interdisposed between said joint materials.

4. A method according to claim 3, wherein said members of said first element and of said second element are in the form of thin foils.

5. A method according to claim 1, wherein said welding is performed by plasma welding and the copper joint material and the iron joint material are arranged in direct contact with members of the first element and of said second element being interdisposed between said joint materials.

6. A method according to claim 1, wherein said welding is performed by TIG welding and the copper joint material and the iron joint material are arranged in direct contact with members of the first element and of said second element being interdisposed between said joint materials.

7. A method according to claim 1, wherein said welding is performed by laser beam welding and the copper joint material and the iron joint material are arranged in direct contact with members of the first element and of the second element being interdisposed between said joint materials.

8. A method for welding copper or a copper base alloy and iron or an iron base alloy wherein the welding is performed without the use of a flux and a molten metal can be observed directly, characterized in that a copper joint material containing at least 90 percent of copper and an iron joint material containing at least 50 percent of iron are welded together by melting closely adjacent portions of the copper joint material and the iron joint material into a weld metal and by incorporating into said weld metal a first element for pulverizing the crystal grains of iron matrix in the weld metal, said first element being at least one member selected from the group consisting of titanium, aluminum, zirconium, niobium and tantalum, and a second element for enhancing the total miscibility of copper and iron in the weld metal, said second element being at least one member selected from the group consisting of nickel, silver, palladium and platinum, wherein said first element is added in an amount of from 0.8 to 8 percent by weight and said second element is added in an amount of from 0.2 to 17 percent by weight, based on the weight of the weld metal containing 10 to 70 percent by weight of copper and 90 to 30 percent by weight of iron.

9. A method according to claim 8, wherein the first element is titanium and the second element is nickel.

10. A method according to claim 8, wherein said welding is performed by electron beam welding and the copper joint material and the iron joint material are arranged in direct contact with members of the first element and of said second element being interdisposed between said joint materials.

11. A method according to claim 10, wherein said members of said first element and of said second element are in the form of thin foils.

* * * * *